UNITED STATES PATENT OFFICE.

ADOLPH FRANK, OF CHARLOTTENBURG, AND NIKODEM CARO, OF BERLIN, GERMANY, ASSIGNORS, BY MESNE ASSIGNMENTS, TO AMERICAN CYANAMID COMPANY, OF PORTLAND, MAINE, A CORPORATION.

PROCESS OF MAKING NITROGEN COMPOUNDS.

No. 12,762. Specification of Reissued Letters Patent. Reissued Mar. 10, 1908.

Original No. 785,161, dated March 21, 1905, Serial No. 699,847. Application for reissue filed June 25, 1907. Serial No. 380,989.

*To all whom it may concern:*

Be it known that we, ADOLPH FRANK, of Charlottenburg, and NIKODEM CARO, of Berlin, Germany, have invented certain new and useful Improvements in the Manufacture of Nitrogen Compounds; and we do hereby declare the following to be a full, clear, and exact description of the invention, such as will enable others skilled in the art to which it appertains to make and use the same.

As is well known and as confirmed by Moissan, (*Comptes Rendus* for 1894, page 503,) no reaction or combination takes place when nitrogen is brought into contact with a heated carbid. We have, however, discovered that suitably-heated carbids will absorb nitrogen under certain conditions—for instance, in the presence of aqueous vapor, as described in our British Patent No. 15,066, of August 10, 1895, and in our patent of the United States, No. 590,217 of September 21, 1897, or in the presence of an oxid of a metal as described in our patent of the United States, No. 623,709, of April 25, 1899—and that cyanids corresponding to the carbid used are obtained from the products of the reaction.

Although the yield of the cyanid by the processes described is highly satisfactory, yet it appeared to us to be inadequate, and this led us to further investigation, which resulted in the discovery of the cause of it, which we found to be due to a great portion of the nitrogen being fixed in the form of other nitrogen compounds—namely, in the form of cyanamids, also called "amidocyanid" and "amidooxycyanid" in the case of calcium carbid according to the following equation:

$$CaC_2 + N_2 = CaNCN + C$$

which were practically lost in the former processes.

We have furthermore, discovered that the satisfactory yield in cyanid by the processes described in our patents above referred to was due chiefly to the more or less complete melting of the carbid or the carbid-forming mixture during the reaction and that this also has a disadvantage in that it prevents the absorption of nitrogen to a great extent, while substantially complete absorption or saturation takes place when the carbid remains unmelted—that is to say, in a pulverulent or porous state.

As is well known, the carbids of the alkalies, such as sodium and potassium carbid, melt at the temperatures to which they must be heated—namely, to from a dark-red to a bright-yellow heat— in order to readily absorb nitrogen, while the melting-point of other carbids, as for instance, barium carbid—is so close to that temperature that melting can hardly be prevented, especially when compounds of the carbid-containing substances which melt at those temperatures or at a lower temperature are employed, such substances acting as a flux. This, however, is not the case with calcium and some other carbids the melting-point of which is much higher than the temperatures to which they are to be heated for the ready absorption of nitrogen. These investigations and experiments led us to the discovery of dividing the process into two separate steps, consisting in first reacting with nitrogen upon certain carbids or carbid-forming mixtures heated to a temperature below their melting-point, but sufficiently high to readily absorb nitrogen, whereby the cyanamids above referred to are chiefly formed, and then melting the reaction product to convert the cyanamids into cyanid.

In carrying out our invention pure nitrogen or nitrogen compounds, as ammonia, may be used, and we proceed as follows: The calcium carbid, for instance, is heated in a suitable furnace to a temperature below the melting-point, preferably not higher than to a dark-red or bright-yellow heat, or to a temperature which may vary from about 900° to 1,000° centigrade, and is then reacted on with nitrogen until absorption of the latter ceases. As the carbid is not melted, there is no interference with the absorption of nitrogen, which thus proceeds much more rapidly and completely, while cyanamid is chiefly formed, which in the older processes was lost to a great extent and which may be extracted as hereinafter described. To convert this cyanamid into cyanid, the product of the reaction is removed from the furnace and melted, which is materially facilitated and expedited by the addition thereto before or during melting of a suitable flux—for instance, caustic soda, caustic potash, sodium carbonate, potassium carbonate, or other suitable salts. As a certain proportion of carbon is set free during the action of the nitrogen on the carbid and should the product of the reaction be deficient in carbon, it is advantageous to make up the deficiency by the addition of a quantity of carbon. On the other hand, the product of the reaction should contain sufficient of the base to bind the cyanogen formed by the melting of the said product, and if this should not be the case a basic substance—for instance, an oxygen compound of the alkalies or of the alkaline earths such as caustic soda, caustic potash, sodium, or potassium carbonate, lime, calcium carbonate, or the like—is also added, which may of course also be used as fluxes, as above stated.

By the melting of the reaction product the metal compound—for instance, of the calcium cyanid formed—namely, the cyanamid CaNCN—is converted into cyanid according to the equation $CaNCN + C = Ca(CN)_2$ and is extracted in the usual manner. Cyanamid may, however, be obtained by leaching it out of the reaction product with water and extracting it from the solution by means of a suitable solvent, as ether, from which it may be obtained by evaporation.

Any carbid that will not melt when heated to from a dark-red to a bright-yellow heat can therefore be employed in our process, and it is of course immaterial in what form the carbid is used, whether as such—*i. e.*, pure carbid or carbid in the process of formation—or in the form of its reaction components. The term "carbid" is therefore intended to cover any form of such.

We claim:—

1. The process of producing cyanid from carbids, which consists in heating from a dark-red to a bright-yellow heat, a carbid that will not melt at these temperatures, reacting upon the heated carbid with nitrogen, then melting the product of the reaction and extracting the cyanid in the usual manner, substantially as set forth.

2. The process, which consists in heating to from a dark-red to a bright-yellow heat a carbid that will not melt at these temperatures, reacting upon the heated carbid with nitrogen, then melting the reaction product in the presence of carbon and extracting the cyanid in the usual manner, substantially as set forth.

3. The process, which consists in heating to from a dark-red to a bright-yellow heat a carbid that will not melt at these temperatures, reacting upon the heated carbid with nitrogen, melting the reaction product in the presence of an oxygen compound of an alkali metal and extracting the cyanid in the usual manner, substantially as set forth.

4. The process, which consists in heating to from a dark-red to a bright-yellow heat a carbid that will not melt at these temperatures, reacting upon the heated carbid with nitrogen, and leaching the cyanamid out of the reaction product.

5. The process of producing calcium cyanamid which consists in reacting with nitrogen upon calcium carbid at a temperature sufficient to produce calcium cyanamid but below that required for converting calcium cyanamid into calcium cyanid.

6. In a process of producing calcium cyanid, the step which consists in melting calcium cyanamid in presence of carbon to convert it into calcium cyanid.

In testimony whereof we have signed our names to this specification in the presence of two subscribing witnesses.

ADOLPH FRANK.
NIKODEM CARO.

Witnesses:
HENRY HASPER,
WOLDEMAR HAUPT.